(12) United States Patent
Younkin

(10) Patent No.: US 7,295,135 B2
(45) Date of Patent: Nov. 13, 2007

(54) FLIGHT INFORMATION SYSTEM

(75) Inventor: James R. Younkin, Springdale, AR (US)

(73) Assignee: TruTrak Flight Systems, Inc., Springdale, AR (US)

( * ) Notice: Subject to any disclaimer, the term of this patent is extended or adjusted under 35 U.S.C. 154(b) by 54 days.

(21) Appl. No.: 11/347,918

(22) Filed: Feb. 6, 2006

(65) Prior Publication Data

US 2007/0182590 A1    Aug. 9, 2007

(51) Int. Cl.
  *G01C 21/00*    (2006.01)
(52) U.S. Cl. ............... 340/971; 340/946; 340/967; 340/973; 340/975; 340/979; 704/4; 704/11; 704/13; 704/14
(58) Field of Classification Search ............. 340/945, 340/971, 973, 969, 970, 977, 978, 979, 975, 340/967, 946; 701/3, 4, 7, 213; 704/4, 11, 704/13, 14
See application file for complete search history.

(56) References Cited

U.S. PATENT DOCUMENTS

| | | | |
|---|---|---|---|
| 4,212,443 A | | 7/1980 | Duncan et al. |
| 4,244,215 A | | 1/1981 | Frosch et al. |
| 4,303,978 A | | 12/1981 | Shaw et al. |
| 4,326,189 A | | 4/1982 | Crane |
| 4,646,255 A | | 2/1987 | Ebert et al. |
| 4,860,007 A | | 8/1989 | Konicke et al. |
| 4,914,598 A | | 4/1990 | Krogmann et al. |
| 5,136,301 A | | 8/1992 | Bechtold et al. |
| 5,250,947 A | * | 10/1993 | Worden et al. ............. 340/973 |
| 5,359,890 A | * | 11/1994 | Fulton et al. ............. 73/178 R |
| 5,412,382 A | | 5/1995 | Leard |
| 5,574,650 A | | 11/1996 | Diesel |
| 5,844,504 A | * | 12/1998 | Etherington ................ 340/973 |
| 5,978,715 A | | 11/1999 | Briffe et al. |
| 6,057,786 A | * | 5/2000 | Briffe et al. ................ 340/975 |
| 6,111,525 A | * | 8/2000 | Berlioz et al. ............. 340/971 |
| 6,332,103 B1 | | 12/2001 | Steenson et al. |
| 6,389,333 B1 | | 5/2002 | Hansman et al. |
| 6,573,841 B2 | | 6/2003 | Price |
| 6,702,229 B2 | * | 3/2004 | Anderson et al. ........... 244/1 R |
| 6,832,138 B1 | * | 12/2004 | Straub et al. ................. 701/3 |
| 6,865,453 B1 | * | 3/2005 | Burch et al. ................. 701/4 |
| 6,867,711 B1 | * | 3/2005 | Langner et al. ............. 340/979 |

(Continued)

OTHER PUBLICATIONS

Dynon Avionics, Advertisement, Sport Aviation, Jan. 2006, p. 23.

(Continued)

*Primary Examiner*—Tai Nguyen
(74) *Attorney, Agent, or Firm*—James Richards

(57) ABSTRACT

A flight instrument displays azimuth information in combination with horizon information and other optional information such as altitude and/or airspeed. Azimuth information is displayed using an elliptical pattern placed below a horizon line displaying horizon information. The horizon information may be based on gyro enhanced vertical speed and/or vertical axis information. The elliptical pattern may be representative of a horizontal circular heading indicator viewed from above and behind the circular indicator. In one embodiment, the elliptical azimuth pattern moves in response to movement of the horizon line to maintain position below the horizon line. Airspeed and/or altitude information may be displayed at the sides of the screen area using a circular arc display pattern.

15 Claims, 6 Drawing Sheets

U.S. PATENT DOCUMENTS

| | | | |
|---|---|---|---|
| 6,885,313 B2 * | 4/2005 | Selk et al. | 340/945 |
| 6,961,643 B1 | 11/2005 | Younkin et al. | |
| 6,985,091 B2 | 1/2006 | Price | |
| 7,091,881 B2 * | 8/2006 | Judge et al. | 340/979 |

OTHER PUBLICATIONS

Dynon Avionics, Advertisement, Sport Aviation, Aug. 2005, p. 61.
Avidyne, Advertisement, AOPA Pilot, Dec. 2005, p. 107.
Columbia, Advertisement, AOPA Pilot, Nov. 2005, pp. 32-33.
Blue Mountain Avionics, Inc., "EFIS/One Pilot's Guide", PDF Document, 2003.
Chelton Flight Systems, Inc., "Flightlogic Pilot's Operating Guide and Reference, Section 4—Button Menu Functions," PDF Document, Nov. 21, 2005.
Chelton Flight Systems, Inc., "Flightlogic Pilot's Operating Guide and Reference, Section 5—Step by Step Procedures," PDF Document, Nov. 21, 2005.
Grand Rapids Technologies, Inc., "EFIS Horizon Series 1 Operations Manual," PDF Document, Feb. 20, 2006.
Garmin Ltd., "G1000 Pilot's Training Guide, Instructor's Reference," PDF Document, Aug. 2005.
Grand Rapids Technologies, Inc., "Experimental Aircraft Engine Monitoring Systems," HTML Document, May 7, 2006.

* cited by examiner

FLIGHT INFORMATION SYSTEM

BACKGROUND

1. Field of the Invention

The present invention pertains to the field of aircraft flight control and instrumentation, more particularly to the field of displaying flight information sourced from a plurality of sensors and/or devices.

2. Background of the Invention

Aircraft flight control is a complex activity involving the management of information from numerous instruments that keep track of aircraft flight states including three axes of position and velocity, three axes of aircraft attitude, wind, engine and airframe configuration, flaps, trim. For proper, efficient, and safe flight, the pilot must keep track of and manage all of this information, often in a rapidly changing environment.

Historically, flight information has been displayed on individual instruments, typically using electromechanical displays. Heading has been displayed on a heading display driven from a heading gyro. Horizon information has been displayed on an artificial horizon display driven from a horizon gyro. More recently, modern cockpits are beginning to use "glass" displays, i.e., computer graphic displays rather than electromechanical displays. ("Glass" displays may in fact utilize plastic transparent layers instead of actual glass.) Glass displays offer advantages in flexibility of display pattern, simplicity in construction, potentially lower cost, lighter weight and other advantages. The advent of larger brighter displays has stimulated a trend to combine multiple conventional instrument information in a single display. Multiple flight instruments may be displayed in an EFIS (Electronic Flight Instrument System). Multiple engine instruments may be displayed in an EMS (Engine Monitoring System).

The complete flexibility of a glass display, however, can be an obstacle as well as an advantage, permitting a wide range of unfamiliar, non-intuitive display symbols in unfamiliar relationships and allowing complex modes of operation requiring too much pilot input to obtain essential information.

Therefore, there is a need for a flight information display that combines information from multiple sources and presents the essential information in an intuitive, simple to operate display format that minimizes pilot workload and fatigue.

BRIEF DESCRIPTION OF THE INVENTION

Briefly, the present invention is a system and associated method wherein a flight instrument displays azimuth information in combination with horizon information and other optional information such as altitude and/or airspeed. Azimuth information is displayed using an elliptical pattern placed below a horizon line displaying horizon information. The horizon information may be based on gyro enhanced vertical speed and/or vertical axis information. The elliptical pattern may be representative of a horizontal circular heading indicator viewed from above and behind the circular indicator. In one embodiment, the elliptical azimuth pattern moves in response to movement of the horizon line to maintain position below the horizon line. Airspeed and/or altitude information may be displayed at the sides of the screen area using a circular arc display pattern In one embodiment, the altimeter or airspeed circular arc display may be more particularly described as a shape following a continuous arc without substantial deviation from the arc. Further, the scale begins near a vertical edge of the display and terminates at a lower point near the same vertical edge of the display. Also, the arc, or continuous curve, begins at a point relatively near a vertical edge of the display and runs relatively farther from the vertical edge and ends relatively near the vertical edge of the display.

BRIEF DESCRIPTION OF THE FIGURES

The present invention is described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE PREFERRED EMBODIMENTS

The present invention is a flight instrument display that combines flight information from several sources to yield a concise intuitive unified display. The present invention utilizes an elliptical display of azimuth information in combination with horizon information to provide a unified picture of pitch, yaw and azimuth in relation to an airplane icon at the center of the display.

In a further embodiment, altitude and airspeed information may be displayed on either side of the display. Altitude may be displayed using a scale in the shape of an arc of a circle. The altitude scale moves relative to a fixed reference pointer in response to altitude changes. Likewise, airspeed may be displayed using a circular arc scale on the opposite side of the display. The airspeed scale moves relative to a fixed reference pointer in response to airspeed changes.

In a further embodiment of the invention, the pitch information may comprise gyro enhanced vertical speed information. Although the pitch display may be driven by pitch attitude angle information, it may be advantageous to drive the pitch display with gyro enhanced vertical speed information. Further details on generating and displaying gyro enhanced vertical speed may be found in U.S. Pat. No. 6,961,643, issued Nov. 1, 2005 to Younkin et al., which is incorporated herein by reference in its entirety.

An ellipse, as used by the present invention, is generally a flattened circle, alternatively an oval with two opposite ends symmetrical. Preferably, the ellipse is a shape which may be defined by a conic section for a right circular cone where the cutting plane is inclined to the base but does not pass through the base. An ellipse may be generated as the locus of points, the sum of whose distances from two fixed points is a constant. The ellipse as used in this disclosure may be more general than the mathematical ellipse, but does not include a circle.

Numerous advantages accrue from using an elliptical azimuth display placed below a horizon display. The elliptical shape efficiently utilizes vertical space on the screen, allowing better placement of information. The ellipse is suggestive of a horizontal circular azimuth display below the airplane icon of the horizon display, tying the two displays together in one unified display. Further, the space left from the horizon/azimuth display allows the use of circular arc instrument displays for such information as altitude and airspeed. Such circular arc instruments provide a better sense of motion and better resolution than a linear tape scale of the same height.

Further benefits and advantages of the present invention will now be described with reference to the drawings.

Figure 1A:
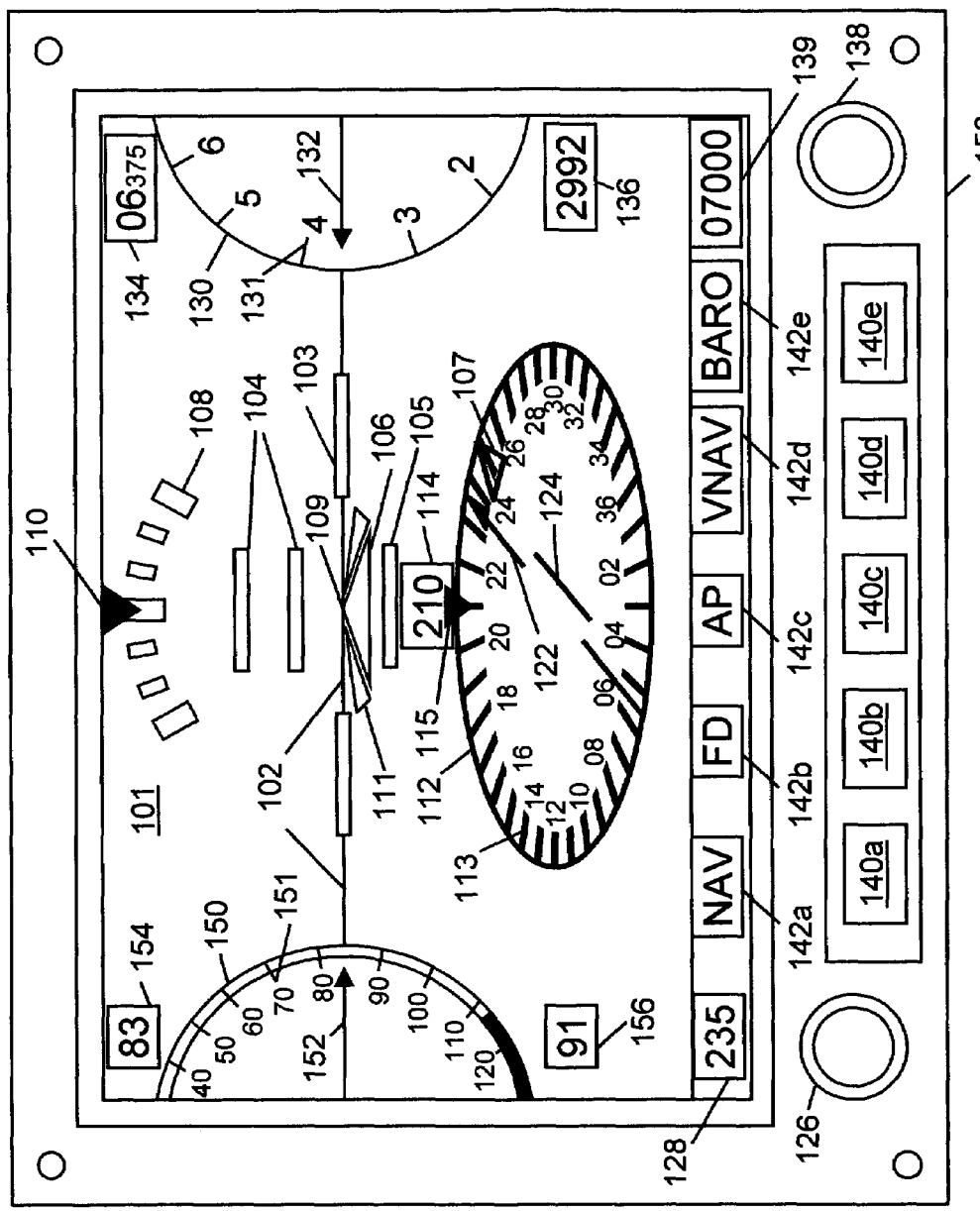
FIG. 1A illustrates a flight instrument displaying multiple flight parameters on a single display screen in accordance with the present invention.

FIG. 1A illustrates a flight instrument display showing multiple flight parameters on a single display screen in accordance with the present invention. The flight instrument of FIG. 1A is shown displaying horizon information, directional gyro information, altitude information and air speed information. In addition, auxiliary function buttons may be provided for such functions as autopilot and/or flight director modes. Referring to FIG. 1A, the display comprises a display screen 101 and a bezel 158. The bezel 158 includes a number of control buttons 140a-140e with associated soft labels 142a-142e ("soft" labels are software programmable labels), and knobs 126 and 138 with associated soft labels 126 and 142 in the display screen 101.

Figure 1B:
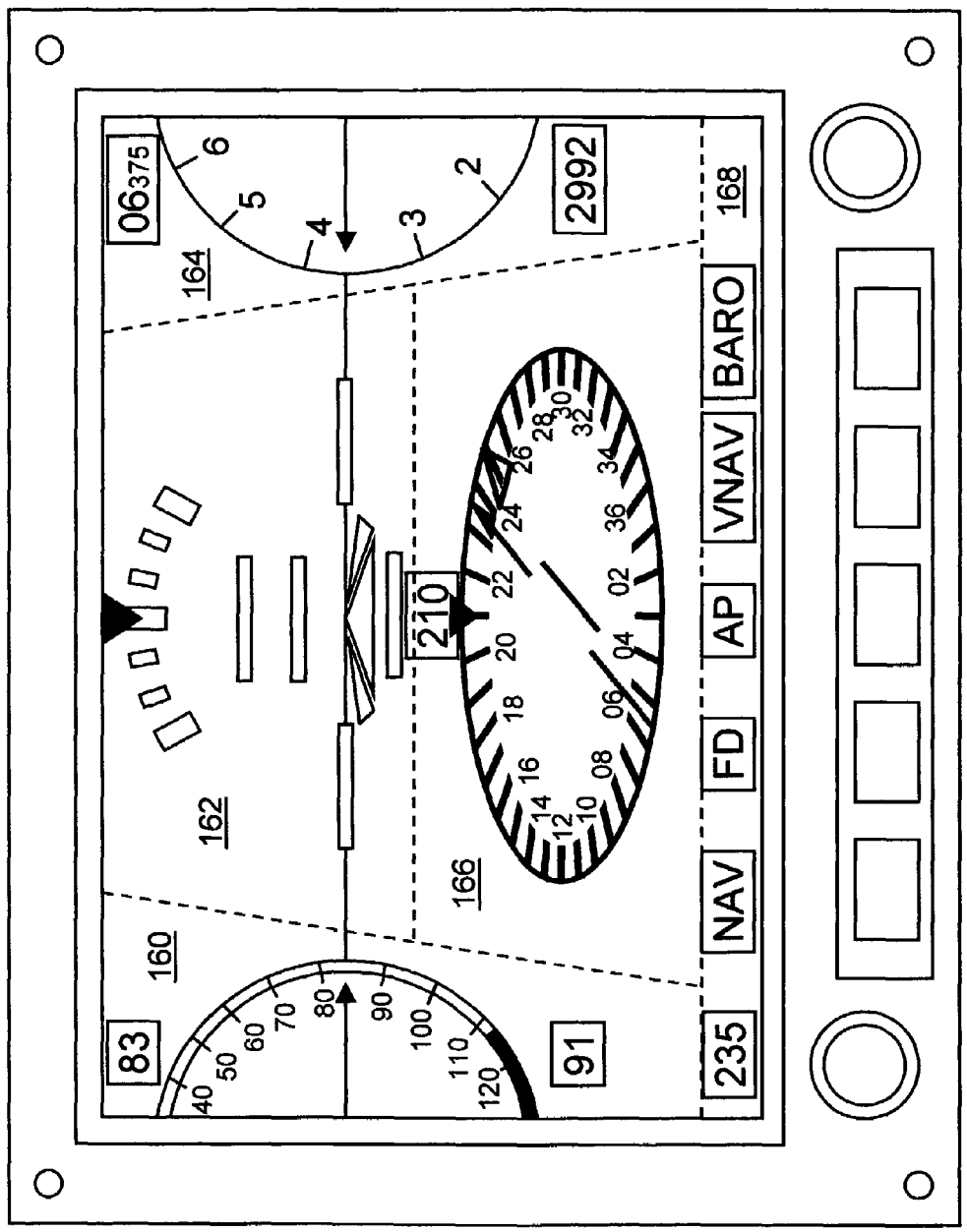
FIG. 1B illustrates regions associated with different displays within the display screen of FIG. 1A.

FIG. 1B illustrates regions associated with different displays within the display screen of FIG. 1A. FIG. 1B shows the features of FIG. 1A with the reference numbers removed for clarity. Additional dotted lines in FIG. 1B indicate regions of the display screen devoted to specific sub displays. The dotted lines are not part of the display. The regions are indicated by underlined reference numbers within the respective region. Dotted lines and region reference numbers are not shown in FIG. 1A because of the high density of information. Referring to FIG. 1B, region 160 displays airspeed information and may also be called the airspeed indicator 160. Region 162 displays horizon information and may also be called the artificial horizon display 162. Region 164 displays altitude information and may also be called the altimeter 164. Region 166 displays azimuth information and may also be called the azimuth display 166 or heading display 166. Region 168 displays soft values for the buttons or knobs below the display. The screen 101 of FIG. 1A includes all five regions 160, 162, 164, 166, and 168 shown in FIG. 1B.

Referring to FIG. 1A and FIG. 1B, the upper central portion 162 of the display screen 101 displays artificial horizon information including roll and pitch displays. The artificial horizon display 162 comprises a horizon line 102, which tilts or rotates to indicate roll angle and moves up or down to indicate pitch. The horizon line 102 tilts counter clockwise to maintain a near horizontal angle relative to the earth as the aircraft rolls to the right and moves up as the aircraft pitches down to simulate the apparent movement of the horizon up, hence the name artificial horizon 162. The background of the screen 101 above the horizon line 102 is typically blue to indicate sky and the background below the horizon line 102 is typically brown to indicate earth. In one embodiment, the horizon line 102 is actually a color demarcation between the sky color and earth color. The center of the artificial horizon display 162 includes an aircraft symbol or icon 106 with two wing bars 103. The aircraft 106 and wing bars 103 are fixed in place relative to the screen 101 as are the actual aircraft fuselage and wings. Thus, the artificial horizon display 162 shows symbolically the relative pitch and roll angles of the actual aircraft fuselage and wings relative to the actual horizon. The pitch display includes a pitch scale 104. When the pitch display is driven by gyro enhanced vertical speed information, the pitch scale may indicate 500 feet per minute (150 meters/minute) for each incremental bar 104. When the pitch scale is driven by pitch attitude information the bars may indicate ten degree increments of pitch attitude. The pitch scale 104 moves with the horizon line 102, i.e. the marks 104 move up for pitch down maneuvers and rotate around the center of the horizon line for roll maneuvers. In an alternative embodiment, the pitch scale 104 moves with the horizon line in pitch, but does not rotate in roll.

A second portion of the pitch angle scale resides below the horizon line. The center point 109 of the airplane icon 106 also forms part of the pitch scale, indicating level flight when driven by vertical speed and zero pitch attitude when driven by pitch attitude. A bar 105 below the aircraft icon indicates a climb vertical speed of 500 feet per minute or ten degrees pitch up, depending on the information source type. The lower bar 105 remains fixed relative to the screen 101, as does the aircraft icon 106, i.e., the lower bar 105 does not move in response to pitch or roll changes. For pitch down maneuvers, additional bars may be shown above the airplane and below the horizon line, as the "sky" moves up and "uncovers" additional pitch scale bars.

The roll display includes a reference mark 110 stationary on the screen 101 and a roll angle scale 108 comprising seven ten-degree marks indicating roll angle. The roll angle scale 108 rotates around the center point of the aircraft icon 109 in response to roll angle variations.

Azimuth Display

The lower central portion 166 of the display screen 101 comprises an azimuth display 166. The azimuth display 166 is typically used to display aircraft heading; however, aircraft course may also be displayed. The azimuth display 166 comprises an elliptical pattern representative of an azimuth circle. As shown in FIG. 1A, the elliptical pattern comprises an ellipse 112 and a scale 113. The scale 113 comprises 36 radial line segments indicating ten-degree increments in azimuth. Numerical radial values are provided for 20 degree increments. Other scale designs and numerical values may be used. At the top center of the elliptical pattern is a reference marker 115 indicating aircraft heading (or course). The heading value may also be indicated digitally 114 above the reference marker 115. The scale 113 rotates to indicate changes in heading, i.e. the scale 113 moves around the perimeter of the ellipse 112. The movement of the scale 113 provides an analog sense of rotation to the pilot, similar to the rotation of a conventional heading card in a directional gyro.

The use of an elliptical pattern 112 and 113 to display azimuth information provides multiple benefits. The ellipse 112 uses less vertical space than a full circle, allowing more space for artificial horizon pitch and roll displays 162 in the same vertical dimension of the display screen 101. Further, the ellipse 112 incorporates an expanded scale 113 at the forward direction, near the reference marker 115, where the greatest resolution is most often needed, i.e., the spacing between scale radial marks is greater near the reference marker than near the right quadrant indicator 116. Further, the ellipse 112 is like a horizontal circular azimuth indicator shown in perspective, viewed from above and behind the circular indicator, i.e. like viewing a horizontal circular azimuth indicator on the ground in front of the aircraft. Alternatively, the elliptical azimuth indicator 112 may be viewed as a horizontal circular indicator placed below the airplane symbol 106 of the artificial horizon 162 above. Thus, the elliptical display 112 provides a natural intuitive complement to the artificial horizon 162 display above. The artificial horizon 162 and azimuth displays 166 can be viewed together as an integrated whole, providing a complete "picture" of pitch, roll, and azimuth all relating to the airplane symbol 106 in the center of the display screen 101.

For pitch up maneuvers, the horizon line 102 potentially invades the space occupied by the azimuth indicator 166. In one embodiment, the ellipse 112 remains fixed relative to the screen 101, and the horizon line and color pattern are allowed to move into the ellipse 112 space and provide a background to the ellipse 112. In another embodiment, the ellipse 112 remains below the horizon line moving down as necessary to prevent interference with the horizon line 102. The bottom of the ellipse 112 may disappear below the bottom of the screen 101 for extreme pitch up maneuvers. Alternatively, the ellipse 102 may contract in vertical dimension, becoming a more extreme ellipse for extreme pitch up maneuvers and/or becoming more nearly a circle for extreme pitch down maneuvers.

In an alternate embodiment, the horizon line 102 may be fixed at the center in pitch, with the airplane icon responsive to pitch variations. For pitch up maneuvers, the airplane icon moves up relative to the horizon line and fixed pitch scale. The horizon line 102 would be responsive to roll information as before, tilting in accordance with the roll angle.

Altitude Display

FIG. 1 also includes an altitude display on the right side of the screen. The altitude display 164 is presented as a portion or arc 130 of a circle. Alternatively the arc 130 may be a portion of an ellipse. The altitude scale 131 on the altitude display 164 moves, i.e. rotates along the arc 130, in response to changes in altitude information. A fixed pointer 132 indicates altitude on the altitude scale 131. Altitude is also indicated by a digital indication 134 above the circular arc 130. A barometer setting value 136 for the altimeter display 164 is shown below the circular arc 130. A knob 138 is provided to adjust the barometer setting 136. Alternatively, (not shown) two buttons like the auxiliary function buttons 140 may be used to set the barometer setting, one for upward adjustments and one for downward adjustments.

The circular arc shape for the altimeter display 164 has numerous advantages. The rotational movement of the circular arc scale 131 is very natural and easy to perceive. The rotational motion may be easier to perceive than a vertical scale on a bar display because the eye more easily observes the rotational motion than the linear motion of a bar display. The rotational motion utilizes two dimensions rather than one and the distance around the arc 130 is longer than for a liner bar of the same height. A further advantage of using the circular arc display 164 is that the circular arc display fits naturally in the space surrounding the horizon display 162 and elliptical azimuth display 166. Also, the circular arc display 164 achieves the rotational perception advantages of a full circular display while more efficiently utilizing horizontal screen space.

In a preferred embodiment, the altitude scale markings show increasing altitude clockwise around the scale, which results in increasing altitude for counter-clockwise rotation of the scale as shown in FIG. 1.

In an alternative embodiment utilizing a circular arc altitude display, the circular arc altitude display is used in combination with a horizon display as shown in FIG. 1, but with and alternative azimuth display such as a heading tape or a circular azimuth display instead of the elliptical azimuth display shown in FIG. 1.

In one embodiment, the altimeter circular arc display 130 may be more particularly described as a shape following a continuous arc without substantial deviation from the arc. Further, the scale begins near a vertical edge of the display and terminates at a lower point near the same vertical edge of the display. Also, the arc, or continuous curve, begins at a point relatively near a vertical edge of the display and runs relatively farther from the vertical edge and ends relatively near the vertical edge of the display.

Airspeed Display

The left side of the screen in FIG. 1 shows an airspeed display 160 comprising a circular arc 150 and scale 151 corresponding to the arc 130 and scale 131 for the altitude display 164. The circular arc scale 151 comprises a plurality of scale marks and numerical indications around the arc 150. Alternatively, the arc 150 may be a portion of an ellipse. The circular arc scale 151 has many of the same advantages for the airspeed display 160 as for the altitude display 164. The airspeed scale 151 rotates relative to a fixed pointer 152 that indicates airspeed. Airspeed is also shown as a digital number 154 above the circular scale 151. Ground speed or GPS speed is shown as a digital number 156 below the circular scale 151.

In a preferred embodiment, the airspeed scale markings show increasing airspeed clockwise around the display, which results in increasing airspeed for counter-clockwise rotation of the scale 151 as shown in FIG. 1.

In one embodiment, the airspeed circular arc display 150 may be more particularly described as a shape following a continuous arc without substantial deviation from the arc. Further, the scale begins near a vertical edge of the display and terminates at a lower point near the same vertical edge of the display. Also, the arc, or continuous curve, begins at a point relatively near a vertical edge of the display and runs relatively farther from the vertical edge and ends relatively near the vertical edge of the display.

Function Controls

The bottom portion 168 of the display 101 includes soft function indications for the controls placed below the display 101. The functions of the buttons and knobs depend on the mode of the display, which is in turn controlled through the buttons. The displayed mode indication is directly above the associated button that activates that mode.

In the initial power-on mode, the display has only the AP 142c, FD 142b, and BARO 142e indications displayed. The NAV 142a and VNAV 142d indications remain blank along with the selector knob values 128 and 139.

Pushing the BARO button 140e brings up a menu showing two selections: Barometer and Brightnes. Successive subsequent pushing of the BARO button 140e alternately selects either Barometer or Brightness mode. In Barometer mode, the right hand knob 138 can be used to set the barometer for the altimeter 164 indicated at indicator 136. In Brightness mode, the right hand knob 138 can be used to set the brightness of the display 101.

Pushing the AP (Autopilot) button 140c places the display system in autopilot control mode. In Autopilot control mode, the NAV 142a and VNAV 142d indications are displayed and the AP 142c display changes to OFF 142c—pressing button 140c again turns off the Autopilot mode. In AP mode, a heading selector 107, also called a heading "bug" is displayed and the left hand knob 128 may be used to set the selected heading. The autopilot will then fly to the selected heading.

In AP mode, pressing the NAV button 140a turns on a selected course indicator 122 and enables the left hand knob 126 for setting the selected course indicator 122. The selected course is shown by the arrow 122 in the azimuth display 166 and by a digital numerical value 128 displayed above the left knob 126. The combination of the heading display 112 and selected course indicator 122 with course deviation bar 124 may also be called a Horizontal Situation Indicator (HSI).

Additional setup functions for the autopilot may be performed using the autopilot setup buttons (not shown) in the autopilot. Autopilot selections, such as selected heading or course, may also be reflected in the display 101.

In one embodiment, the display 142a above the NAV button 140a may indicate GPSS (GPS Steering), depending on the type and capability of the GPS. The display processor may communicate with the GPS unit to automatically determine the GPS capability and set the display accordingly. In GPSS mode, the GPS may set the selected course indication 122 according to a flight program entered in the GPS.

Pressing the VNAV (Vertical Navigation) button 140d brings up a menu to select altitude. In VNAV mode, the autopilot will be commanded to fly to the selected altitude. The right hand knob 138 may be used to set selected altitude 139 which is displayed above the right hand knob 138. Pressing VNAV 140d again allows the selection of vertical speed (if selected altitude is higher than present altitude) or distance (if selected altitude is lower than present altitude.) The right hand knob 138 and associated display 139 may be used for the selection.

Pressing the FD (Flight Director) button 140b turns off the autopilot (if in AP mode) and turns on FD mode. In FD mode the flight director steering bars 111 are displayed. The pilot may then set up NAV or VNAV modes and use the flight director steering bars 111 for guidance in setting attitude as the pilot manually steers the aircraft.

Figure 2:
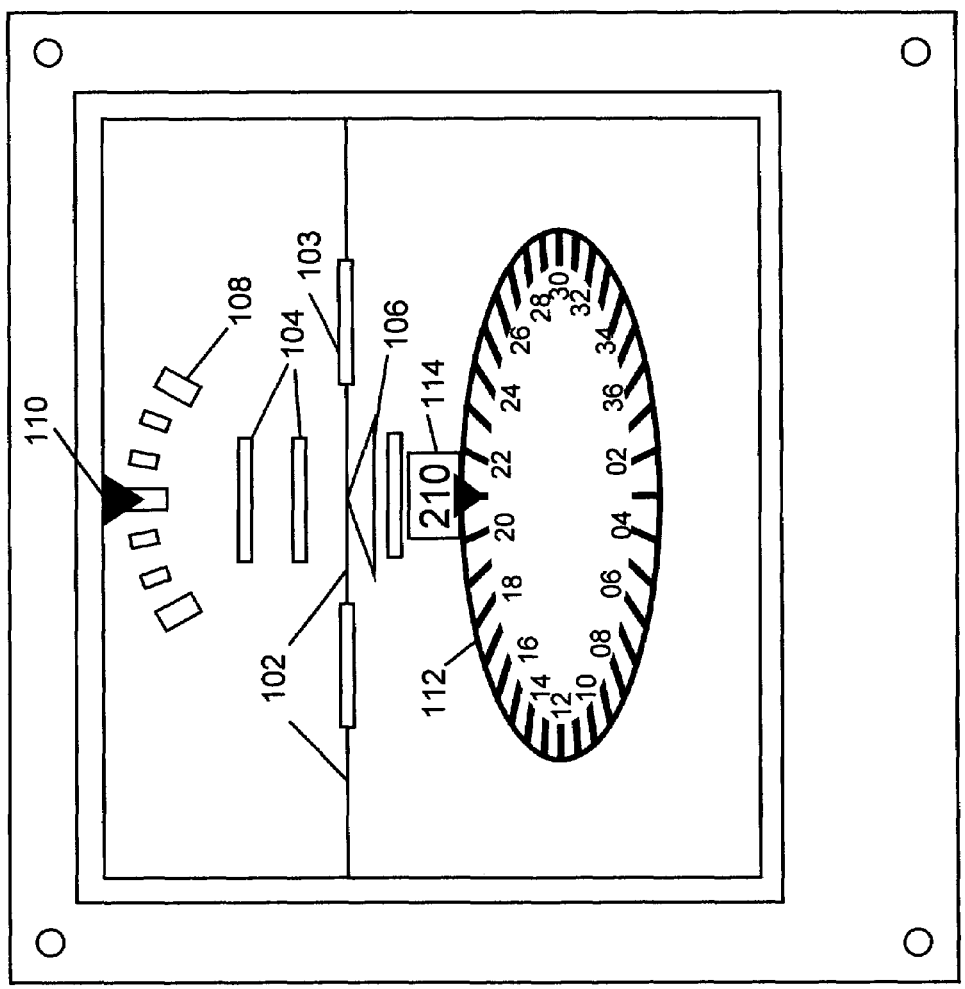
FIG. 2 illustrates a flight instrument displaying pitch, roll, and azimuth on a single display screen in accordance with the present invention.

FIG. 2 illustrates a flight instrument displaying pitch, roll, and azimuth on a single display screen in accordance with the present invention. FIG. 2 shows the combined horizon and azimuth displays without the altitude, airspeed, and auxiliary function controls.

Azimuth Scale for Elliptical Azimuth Display.

Figure 3:
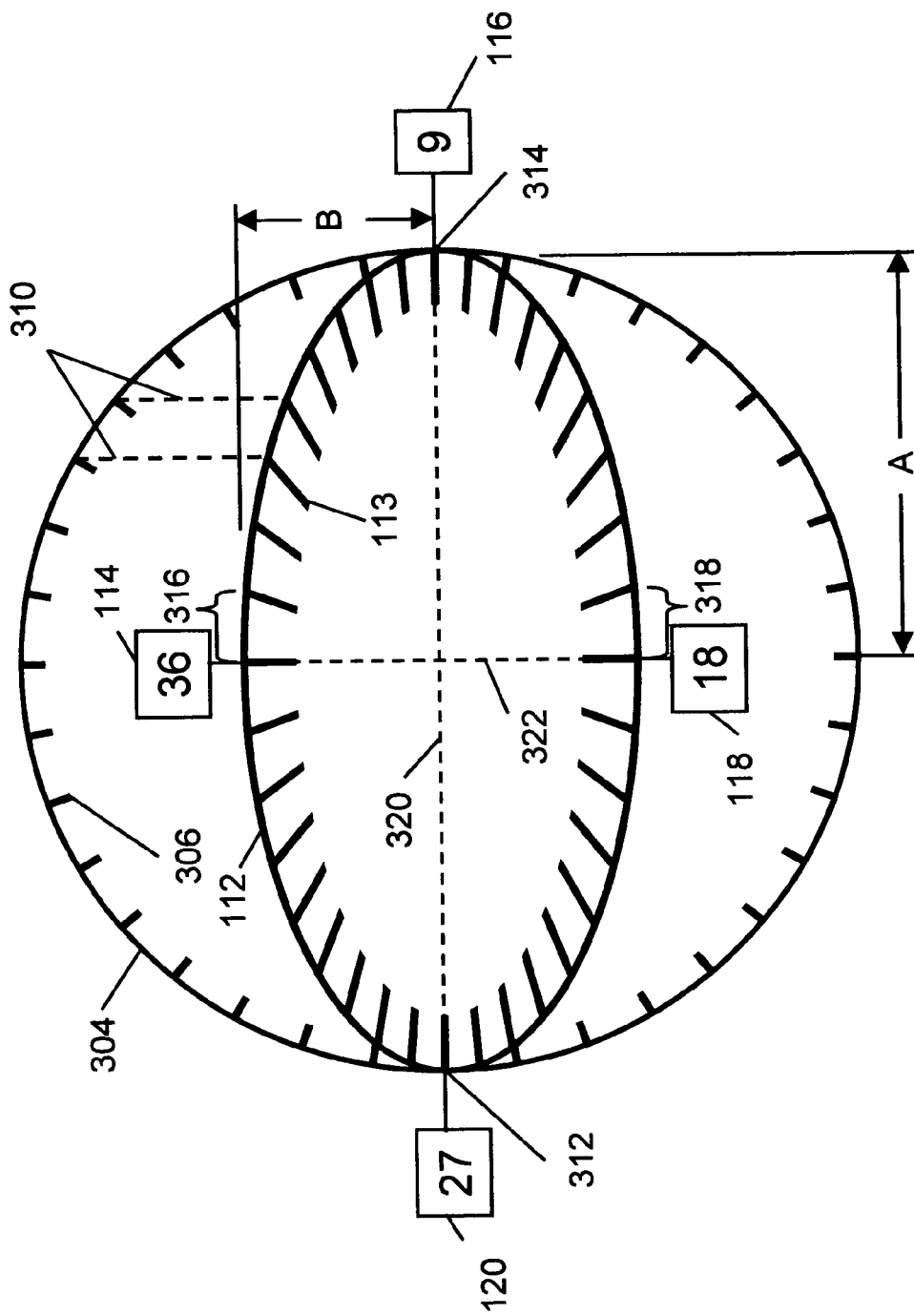
FIG. 3 shows a scale for an ellipse using a parallel line relationship to a circular azimuth display.
Figure 4:
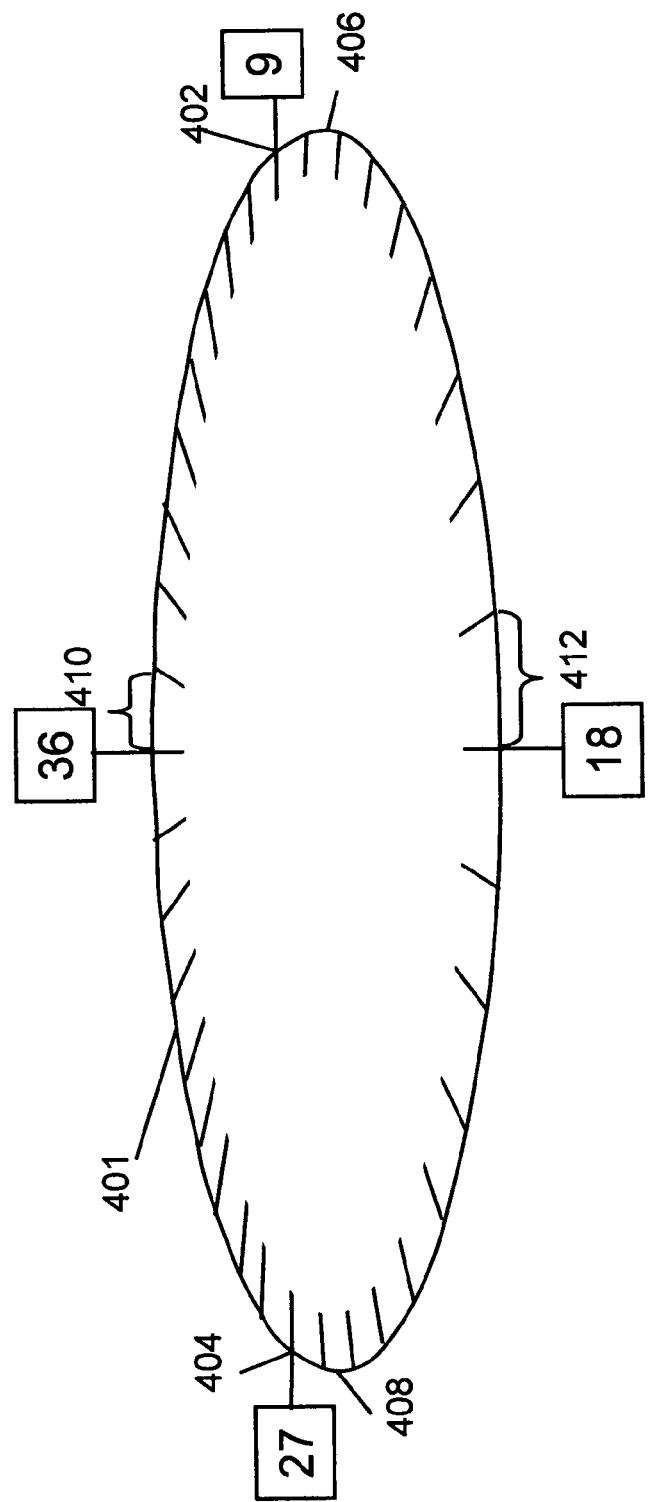
FIG. 4 shows a scale for an ellipse using a perspective relationship to a circular azimuth display.

FIG. 3 and FIG. 4 show two types of scales for the elliptical azimuth display of FIGS. 1 and 2. FIG. 3 shows a scale for an ellipse using a parallel line relationship to a circular azimuth display. Referring to FIG. 3, a circular azimuth scale is generated using a circle 304 and 36 radial line segments 306 at 10-degree increments. An elliptical scale 113 is generated with scale markings based on a circular azimuth display 304 and 306 of the same lateral diameter as the ellipse 112. The elliptical scale 113 is generated by placing an ellipse 112 inside the circle 304 with the major axis of the ellipse 112 overlaying the horizontal diameter of the circle 304 as shown. The scale for the ellipse is generated by using vertical lines 310 from each point of intersection of each line segment 306 with the circle 304 to a corresponding point on the ellipse as shown. A radial line segment 113 is generated from each point of intersection on the ellipse 112 toward the center of the circle 304, which is the center of the ellipse 112. Ten degree increments are shown, but as many lines 113 as desired may be used.

Alternatively the points on the ellipse 112 and/or points of intersection with radial line segments 113 may be found by the following relationship:

$$X = A \sin(\delta - \Psi)$$

$$Y = B \cos(\delta - \Psi)$$

$$P = (X, Y)$$

Where,

X is the x coordinate of the point P,

Y is the Y coordinate of the point P,

A is the major radius of the ellipse 112,

B is the minor radius of the ellipse 112,

P is the point on the ellipse 112 being calculated for the associated azimuth radial δ.

δ is the azimuth radial 113 being calculated, and

Ψ is the heading angle of the aircraft, i.e., the azimuth angle where the aircraft is pointed.

The heading angle Ψ is shown at the top center of the ellipse. FIG. 3 shows a heading angle of 0, which is equivalent to a heading angle of 360. Radials at ten degree increments are often referred to by the first two digits, neglecting the last zero, as shown in FIG. 3.

Thus, the scale markings 113 are spaced laterally proportional to the sine of the azimuth angle and spaced vertically proportional to the cosine of the azimuth angle when zero degrees azimuth is at the top center of the ellipse 320.

Note that with this method of establishing radial markings, the elliptical pattern 112 and 113 is symmetrical about a horizontal line 320 through the center of the elliptical pattern 112 and 113 and symmetrical about a vertical line 322 through the center of the elliptical pattern 112 and 113.

Other equivalent methods may be used to locate and draw the pattern components 112 and 113, and other line styles may be used, or the line style and length may be varied from radial to radial as desired for a particular application.

The scale 113 generated by using vertical lines 310 has a symmetry that is intuitive, and easily understood. Four quadrant radials are shown at the top (36), bottom (18), left (27) and right (9) extremes, allowing clear correspondence with numerical indications placed just outside or inside the ellipse. The 90 degree point 116 is precisely at the right extreme 314 of the ellipse, and the 270 degree point 120 is precisely at the left extreme 312 of the ellipse. The scale increments 316 and 318 are equal at the top and bottom. The symmetry of the scale 113 is also desirable when adding the selected course indicator 122 and course deviation indicator 124.

FIG. 4 shows a scale for an ellipse based on a perspective view of a horizontal circular azimuth display in accordance with the present invention. FIG. 4 shows a circle 401 (appearing as an ellipse 401) as viewed from above and behind the circle 401, i.e. the viewer is in the foreground, lower part of the page. The 18 mark is closer to the viewer than the 36 mark. Note that in the perspective display of FIG. 4, the width of the ten degree scale increment is narrower for the scale increment 410 near the 36 indication than for the scale increment 412 near the 18 indication. Note also that the right 406 and left 408 extremes of the ellipse are not at the 90 degree 402 and 270 degree 404 points.

The perspective view of FIG. 4 is more faithful to the concept that the ellipse display is a horizontal circle viewed in perspective. The perspective display of FIG. 4 may be made more like the symmetrical display of FIG. 3 by moving the point of view farther back from the ellipse. As the point of view approaches infinity, the perspective display approaches the symmetrical display. Thus, the symmetrical display of FIG. 3 supports the perception that the ellipse is a perspective view of a horizontal circle while allowing the 09 and 27 angles to be at the extremes of the ellipse and allowing symmetrical scale widths—two desirable properties for the instrument display.

Figure 5:
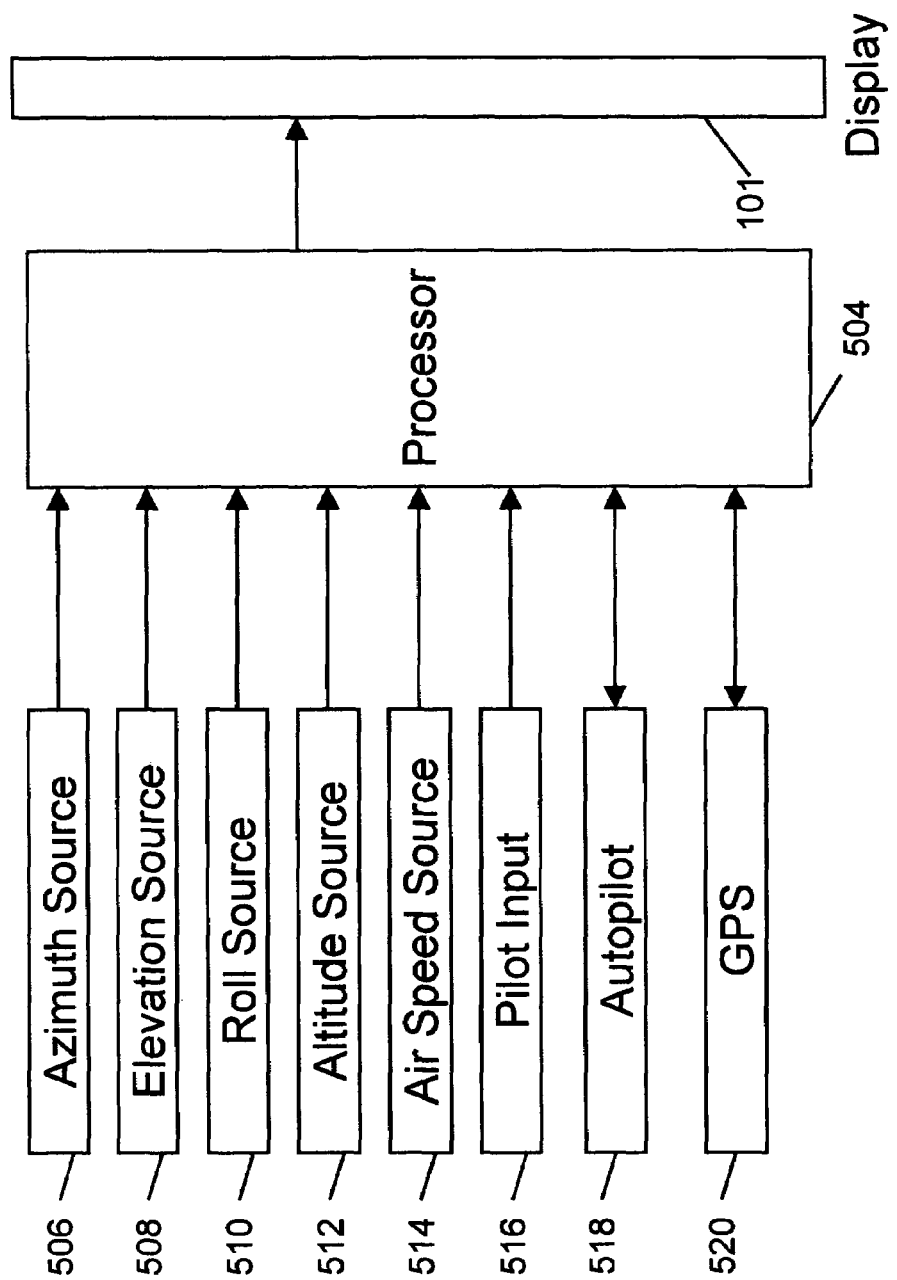
FIG. 5 is a block diagram of a display system incorporating the display in accordance with the present invention.

FIG. 5 is a block diagram of a display system incorporating the display in accordance with the present invention. Referring to FIG. 5, the display 101 is driven by a processor 504, which combines information from a number of sensors and processes the information to produce the display pattern, which is then sent to the display. For example, the processor 504 receives a heading value from an azimuth source 506 and uses the heading value to generate the elliptical azimuth display 166 of FIG. 1A including the ellipse 112 with the scale 113 rotated and oriented to display the received heading value. The processor 504 may also generate the character patterns to display the heading value and write the resulting patterns to the display screen 101. In a similar manner, the processor 504 receives additional information from other sensors and devices and generates screen patterns in accordance with the received information. The processor 504 then sends the screen patterns to the display screen 101.

The display 101 device may be any computer graphic display device. The display device should be preferably high brightness to be viewable in a sunlit aircraft cabin. A color display may be useful for depicting such features as a blue sky region above the horizon line, brown earth region below the horizon line, yellow aircraft icon, colored air speed ranges, or generally for differentiating various markings and values.

The processor 504 may be any processor suitable for the system. The processor may include dedicated logic modules, drivers and such as necessary to drive the display 101. The processor 504 may include multiple sub processors with different architectures as necessary for different calculations. The processor 504 may also include signal conversion, such as analog to digital or serial to parallel conversion to receive data or signals from the various sensors and sources. The processor may include memory of various types including non-volatile memory to store program instructions used to generate display patterns and to store pilot input information and setup information as needed.

The azimuth source 506 may be a heading source. The heading source may be a heading gyro, may be slaved to a magnetic heading source, or may be a number of rate gyros integrated to yield a heading value as in an Attitude and Heading Reference System (AHRS). Alternatively, aircraft course may be displayed as azimuth, such as GPS course. In one embodiment, heading is shown using the elliptical scale 113 and GPS course is shown using the HSI course selector 122 and course deviation bar 124.

The elevation (pitch) source 508 may be gyro enhanced vertical speed information. Pure vertical speed information is typically too slow in response to be used to guide the vertical axis of an aircraft, however, by using gyro information to stabilize the vertical speed information, the resulting signal can be an alternative to pitch attitude information that can simplify pitch axis control of the aircraft. Further details on displaying vertical speed may be found in U.S. Pat. No. 6,961,643, issued Nov. 1, 2005 to Younkin et al., which has been incorporated herein by reference in its entirety.

Alternatively, the elevation source 508 and/or roll source 510 may be a vertical gyro or may be derived from rate gyros or from the AHRS. The roll source may include an inclined rate gyro. Information from the elevation source 508 and roll source 510 are used to generate artificial horizon display patterns.

The altitude source 512 may be from a pressure altitude altimeter or pressure sensor. Alternatively GPS altitude and/or radar altitude may be displayed using the altimeter scale 131. Alternatively, GPS altitude or radar altitude sources may be displayed as a numeric value, while the altimeter scale 131 is used for pressure altitude information.

The airspeed sensor 514 may be a pressure sensor using Pitot-static pressure difference. Airspeed sensor information is used by the processor 504 to generate the airspeed display 160. GPS ground speed may be shown as a numeric value 156.

Pilot inputs 516, such as switches 140a-140e and/or knobs 126, 138, may be provided for selecting operating modes, setting values such as barometer, selected course and/or other values.

An autopilot 518 may be interfaced with the display processor 504 to receive commands from the display processor 504 and/or to provide status information to the display processor 504. In autopilot mode, the display processor 504 allows for turning on and off the autopilot 518, entering selected heading and/or course, entering selected altitude and/or vertical speed and initiating autopilot flight plans. The autopilot 518 may provide information back to the display processor 504 such as accepted commands and current status. In addition, controls on the autopilot panel may be used to enter autopilot commands that may affect information to be displayed by the display processor 504.

A Global Positioning System (GPS) receiver 520 may be interfaced to the display processor 504 to provide such information as GPS ground speed, course. The GPS may be programmed with a flight plan and may perform navigation calculations to follow the flight plan. The results may be displayed as selected course and course deviation, which may then be used to drive the autopilot or the flight director display.

CONCLUSION

Thus, herein described is an aircraft display system that combines information from multiple sources and presents the essential information in an intuitive, simple to operate display format that minimizes pilot workload and fatigue.

While particular embodiments of the invention have been described, it will be understood, however, that the invention is not limited thereto, since modifications may be made by those skilled in the art, particularly in light of the foregoing teachings. It is, therefore contemplated by the appended claims to cover any such modifications that incorporate those features or those improvements which embody the spirit and scope of the present invention.

What is claimed is:

1. A flight instrument having a combined display comprising:
   an artificial horizon display comprising a horizon line responsive vertically to a first information source and responsive in rotation to a second information source;
   an altitude display, said altitude display comprising an altitude scale having a shape following a first continuous arc without substantial deviation from said first continuous arc; and
   a fixed reference pointer, said fixed reference pointer indicating altitude relative to said altitude scale;
   wherein said altitude scale does not form a complete circle; and wherein said altitude scale moves following said first continuous arc in response to altitude information from an altitude information source.

2. The flight instrument of claim 1, wherein said first continuous arc is a portion of a circle or an ellipse.

3. The flight instrument of claim 2, wherein said artificial horizon display and said altitude display are displayed within a display boundary, and wherein said portion of said circle or said ellipse, if extended to complete said circle or said ellipse, would extend beyond said display boundary.

4. The flight instrument of claim 1, further including an airspeed display; wherein said airspeed display comprises an airspeed scale having a shape following a second continuous arc without substantial deviation from said second continuous arc; and a fixed reference pointer;

wherein said fixed reference pointer indicates airspeed relative to said airspeed scale, and said airspeed scale moves following said second continuous arc responsive to airspeed information from an airspeed information source.

5. The flight instrument of claim 4, wherein the second continuous arc is a portion of a circle or an ellipse.

6. The flight instrument of claim 5, wherein said artificial horizon display and said airspeed display are displayed within a display boundary, and wherein said portion of said circle or said ellipse, if extended to complete said circle or said ellipse, would extend beyond said display boundary.

7. The flight instrument of claim 4, wherein said airspeed scale begins near a vertical edge of said combined display and terminates at a lower point near said vertical edge of said combined display.

8. The flight instrument of claim 1, wherein said altitude scale begins near a vertical edge of said combined display and terminates at a lower point near said vertical edge of said combined display.

9. The flight instrument of claim 1, further including an azimuth display responsive to azimuth information from an azimuth information source.

10. The flight instrument of claim 9, wherein the azimuth display comprises an elliptical pattern, said elliptical pattern responsive to heading information from a heading information source.

11. The flight instrument of claim 1, wherein the first information source comprises gyro enhanced vertical speed information.

12. The flight instrument of claim 1, wherein the first information source comprises pitch information.

13. A method for displaying altitude information in combination with horizon information in a combination display comprising the steps of:

displaying a horizon line responsive vertically and in rotation to said horizon information;

displaying an altitude scale to be read relative to a fixed reference pointer; said altitude scale having a shape following a continuous curve without substantial deviation from said continuous curve and without following a complete circle; and moving said scale along said continuous curve in response to said altitude information.

14. The method of claim 13, wherein said continuous curve is a continuous portion of a circle or an ellipse.

15. The method of claim 13, wherein the step of displaying said altitude scale comprises the steps of:

beginning the altitude scale from a beginning point relatively near a vertical edge of a said combination display;

running the altitude scale farther from said vertical edge of said combination display than said beginning point;

ending the altitude scale at an ending point separate from said beginning point, said ending point relatively near said vertical edge of said combination display.

\* \* \* \* \*